United States Patent
Pan et al.

(10) Patent No.: US 12,546,691 B2
(45) Date of Patent: Feb. 10, 2026

(54) FORCE AND VIBRATION MEASUREMENT DEVICE WITH FUNCTION OF PROVIDING ADJUSTABLE FORCE

(71) Applicant: PRIMAX ELECTRONICS LTD., Taipei (TW)

(72) Inventors: Yung-Tai Pan, Taipei (TW); Jui-Hung Hsu, Taipei (TW); Chang-Ming Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 386 days.

(21) Appl. No.: 18/335,526

(22) Filed: Jun. 15, 2023

(65) Prior Publication Data

US 2024/0264053 A1    Aug. 8, 2024

Related U.S. Application Data

(60) Provisional application No. 63/483,542, filed on Feb. 7, 2023.

(51) Int. Cl.
| | |
|---|---|
| *G01N 3/06* | (2006.01) |
| *G01N 3/08* | (2006.01) |
| *G06F 3/0354* | (2013.01) |
| *G01D 21/02* | (2006.01) |
| *G01H 17/00* | (2006.01) |
| *G01L 5/00* | (2006.01) |

(52) U.S. Cl.
CPC ............... *G01N 3/06* (2013.01); *G01N 3/08* (2013.01); *G06F 3/03547* (2013.01); *G01D 21/02* (2013.01); *G01H 17/00* (2013.01); *G01L 5/00* (2013.01)

(58) Field of Classification Search
CPC ....... G01L 5/00; G06F 3/03547; G01D 21/02; G01H 17/00; G01N 3/06; G01N 3/08
See application file for complete search history.

(56) References Cited

U.S. PATENT DOCUMENTS

| | | | | |
|---|---|---|---|---|
| 5,788,791 A | * | 8/1998 | Grewell | B29C 66/92211 156/308.2 |
| 6,453,729 B1 | * | 9/2002 | Muto | G01N 29/46 73/104 |
| 7,124,514 B2 | * | 10/2006 | McMurtry | G01B 7/012 33/559 |

(Continued)

FOREIGN PATENT DOCUMENTS

| | | | | |
|---|---|---|---|---|
| CN | 108332849 A | * | 7/2018 | ............. G01H 17/00 |
| CN | 217739089 U | * | 11/2022 | |

*Primary Examiner* — Jonathan M Dunlap
(74) *Attorney, Agent, or Firm* — WPAT, PC

(57) ABSTRACT

A force and vibration measurement device is provided for testing an under-test object. The force and vibration measurement device includes a testing assembly, an actuator and a guiding mechanism. The testing assembly is used for applying a force on the under-test object, and collecting a force data of the under-test object, a vibration data or a combination of the force data and the vibration data. The actuator is used driving the testing assembly, changing a magnitude of the applied force on the under-test object and changing a distance between the testing assembly and the under-test object. The guiding mechanism is used for limiting an operating direction of the actuator.

11 Claims, 6 Drawing Sheets

(56) References Cited

U.S. PATENT DOCUMENTS

| | | | | |
|---|---|---|---|---|
| 7,819,158 | B2* | 10/2010 | Klinstein | B29C 66/92443 |
| | | | | 156/73.4 |
| 9,919,471 | B2* | 3/2018 | Raszillier | B29C 65/7443 |
| 10,215,675 | B2* | 2/2019 | Khosla | G01N 3/56 |
| 10,900,765 | B2* | 1/2021 | Shimaoka | G01B 5/0009 |
| 2005/0085728 | A1* | 4/2005 | Fukuda | G01N 29/227 |
| | | | | 600/449 |
| 2009/0188966 | A1* | 7/2009 | Klinstein | B29C 66/961 |
| | | | | 228/1.1 |
| 2016/0290797 | A1* | 10/2016 | Bos | G01B 21/04 |
| 2017/0153208 | A1* | 6/2017 | Kawai | G01M 1/30 |
| 2017/0232660 | A1* | 8/2017 | Raszillier | B23K 37/0229 |
| | | | | 156/350 |
| 2019/0154557 | A1* | 5/2019 | Nagasue | G01N 3/58 |
| 2022/0203493 | A1* | 6/2022 | Yamamoto | B23Q 17/12 |
| 2024/0139484 | A1* | 5/2024 | Scherr | G01M 99/007 |

* cited by examiner

FORCE AND VIBRATION MEASUREMENT DEVICE WITH FUNCTION OF PROVIDING ADJUSTABLE FORCE

CROSS-REFERENCE TO RELATED APPLICATION

This application claims priority to U.S. Provisional Patent Application No. US 63/483,542 filed Feb. 7, 2023, the contents of which are incorporated herein by reference.

FIELD OF THE INVENTION

The present invention relates to a force and vibration measurement device with a function of providing an adjustable force, and more particularly to a device for measuring an applied force on a force pad and a vibration amount of the force pad.

BACKGROUND OF THE INVENTION

Conventionally, a testing assembly is capable of testing a single item. The testing assembly needs to be equipped with plural stations to test plural functions. In case that different pressing forces are required to test various products, it is necessary to stop the current test procedure and change the weight condition (e.g., change the weights). In today's digital age, science and technology are developed rapidly. Consequently, consumer electronics products have become indispensable necessity products in daily lives. Especially, input devices have been widely used in various electronic devices, e.g., computers, mobile phones, tablet computers, or the like. During operations of the above electronic devices, users can input instructions into the corresponding computers or mobile phones through input devices.

For example, a force pad is one of the most popular input devices. The force pad is an input device using a force touch technology. The force pad is usually integrated into a notebook computer. The force pad uses a pressure sensor. By the pressure sensor, the force applied on the touch pad or the touch screen can be recognized. In addition, the force pad is equipped with a vibration motor for providing a haptic feedback effect to the user.

As mentioned above, the conventional testing device cannot meet today's requirements. Therefore, it is important to provide a novel measurement device capable of measuring the pressing force on an input device and the vibration amount of the input device. Furthermore, it is not necessary to replace parts of the measurement device when the production line is changed. Consequently, the testing efficiency is enhanced.

SUMMARY OF THE INVENTION

An object of the present invention provides a force and vibration measurement device with a function of providing an adjustable force.

The other objects and advantages of the present invention will be understood from the disclosed technical features.

In accordance with an aspect of the present invention, a force and vibration measurement device is provided for testing an under-test object. The force and vibration measurement device includes a testing assembly, an actuator and a guiding mechanism. The testing assembly is used for applying a force on the under-test object, and collecting a force data of the under-test object, a vibration data or a combination of the force data and the vibration data. The actuator is used for driving the testing assembly, changing a magnitude of the applied force on the under-test object and changing a distance between the testing assembly and the under-test object. The guiding mechanism is used for limiting an operating direction of the actuator.

In an embodiment, the testing assembly includes a force sensor, a vibration sensor and a test probe. The test probe is located near the under-test object.

In an embodiment, the force sensor includes a pressure sensor.

In an embodiment, the vibration sensor includes a gravity sensor or an acceleration sensor.

In an embodiment, the vibration sensor includes a first magnetic attraction part, and the test probe includes a second magnetic attraction part. The first magnetic attraction part and the second magnetic attraction part are magnetically attractable by each other.

In an embodiment, the actuator includes a fixed part and a movable part, and the movable part is movable relative to the fixed part.

In an embodiment, the actuator includes a voice coil motor, a stepper motor, a servo motor or a DC motor.

In an embodiment, the force and vibration measurement device further includes a movable plate, and the movable plate has a first surface and a second surface. The first surface and the second surface are opposed to each other. The first surface of the movable plate is connected with the movable part. The second surface of the movable plate is connected with the testing assembly.

In an embodiment, the force and vibration measurement device further includes a fixing plate. The fixing plate is connected with the fixed part of the actuator.

In an embodiment, the movable plate further includes a hollow portion, and the guiding mechanism includes a guiding body with a top surface and a bottom surface. The top surface and the bottom surface are opposed to each other. The top surface is connected with the fixing plate. The bottom surface is penetrated through the hollow portion.

In an embodiment, the guiding mechanism further includes a sliding rail, a sliding block, a fixing block and a stopping block. The sliding rail is connected with the guiding body. The sliding block is arranged between the sliding rail and the fixing block. The fixing block is connected with the sliding block. The stopping block includes a stopping surface. The stopping surface is connected with a bottom surface of the guiding body. A length of the stopping surface is larger than a length of the hollow portion, a width of the stopping surface is larger than a width of the hollow portion, or an area of the stopping surface is larger than an area of the hollow portion.

In an embodiment, the fixing block is further connected with the movable plate, the movable plate is linked with the fixing block, and the fixing block is linked with the sliding block and slidable relative to the sliding rail. The guiding body is limited by the stopping block. Consequently, the guiding body is not detached from the hollow portion.

In an embodiment, at least one recess is concavely formed in a portion of the sliding rail, at least one protrusion structure is protruded from the sliding block and aligned with the at least one recess, and the at least one protrusion structure is slidable along the at least one recess.

In an embodiment, the force and vibration measurement device is electrically connected with a microcontroller. The microcontroller is connected with a computing device through a USB port, an asynchronous serial communication interface, an Ethernet or a Bluetooth connector. In addition, a control program is installed in the computing device.

In an embodiment, when the control program is executed, the force data and the vibration data from the force and vibration measurement device are received and analyzed, and an electrical condition of the force and vibration measurement device is correspondingly controlled. The electrical condition includes one of a voltage, a current and an electronic signal or a combination of the voltage, the current and the electronic signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
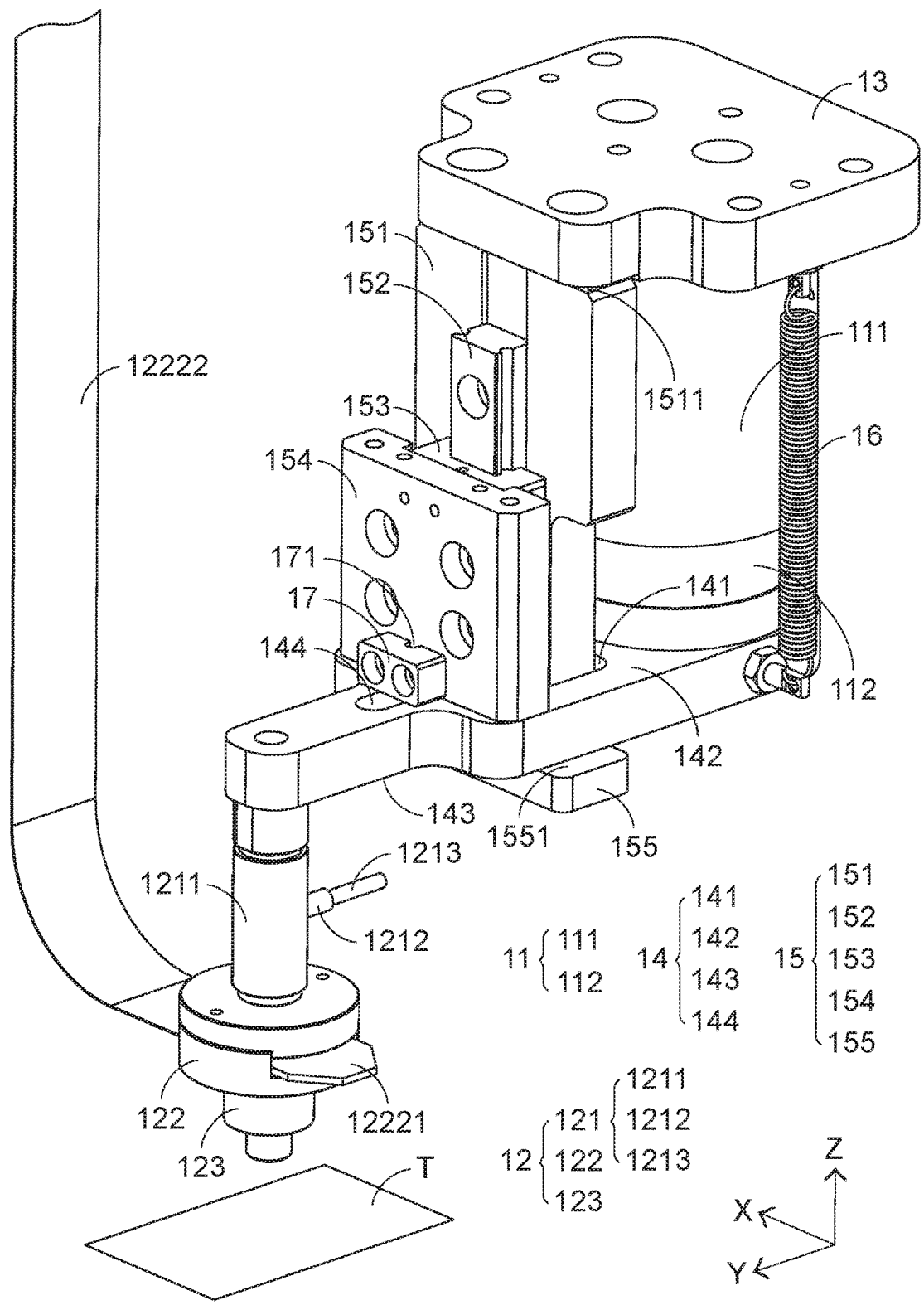
FIG. 1 is a schematic perspective view illustrating a force and vibration measurement device according to an embodiment of the present invention.
Figure 2:
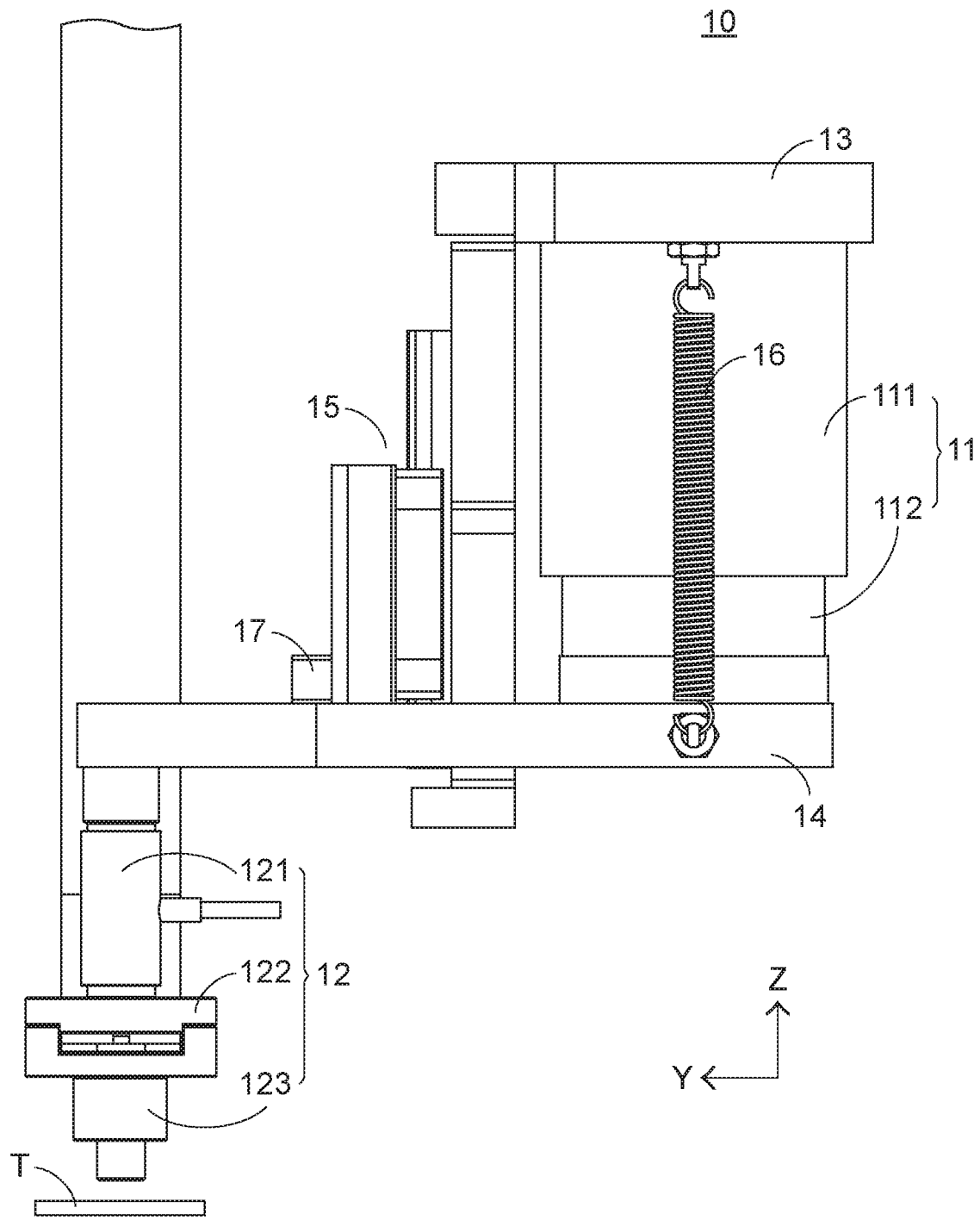
FIG. 2 is a schematic side view illustrating the force and vibration measurement device shown in FIG. 1.
Figure 3:
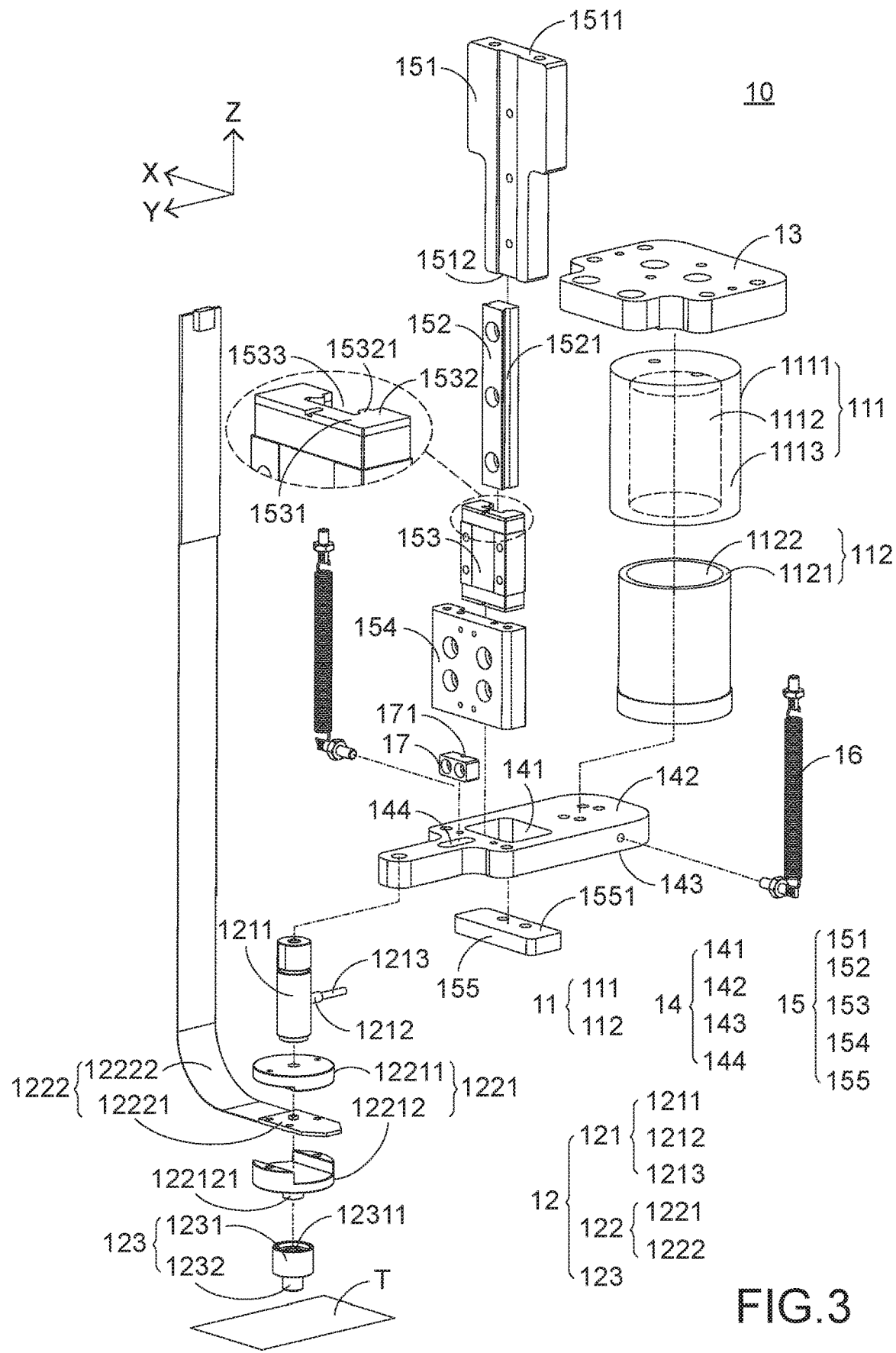
FIG. 3 is a schematic exploded view illustrating the force and vibration measurement device shown in FIG. 1.
Figure 4:
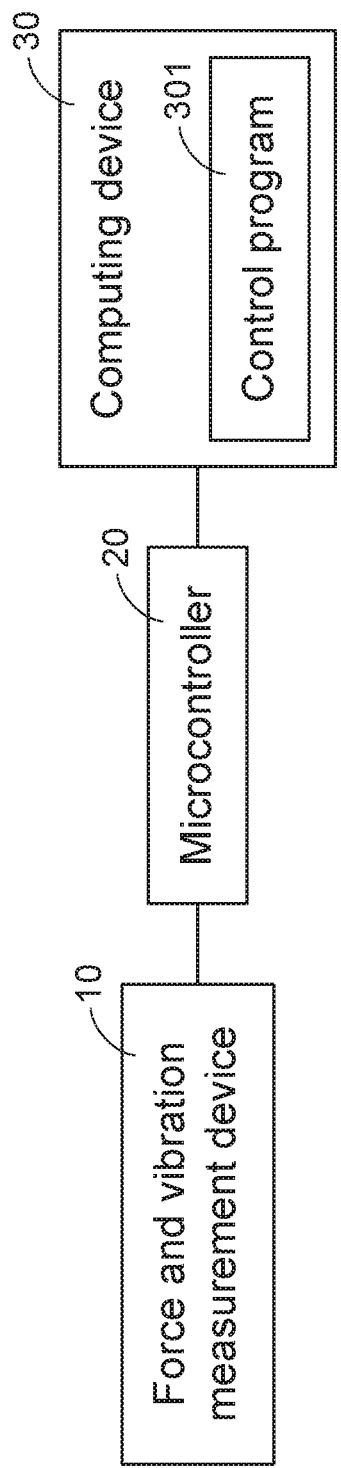
FIG. 4 is a schematic circuit block diagram of the force and vibration measurement device shown in FIG. 1.
Figure 5A:
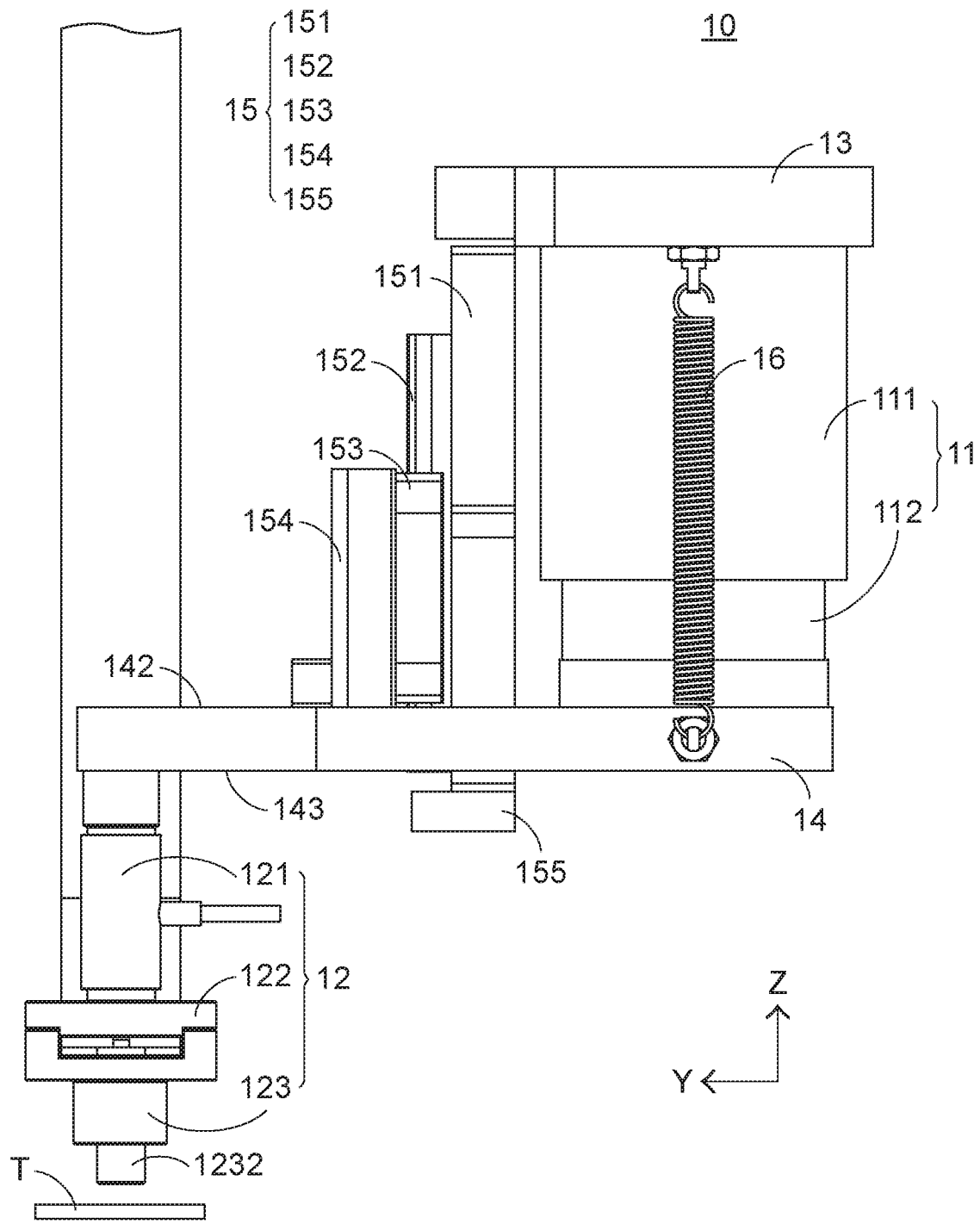
FIGS. 5A and 5B schematically illustrate the relationships and the operations of an actuator, a fixing plate, a movable plate, a testing assembly and a guiding mechanism of the force and vibration measurement device shown in FIG. 1.
Figure 5B:
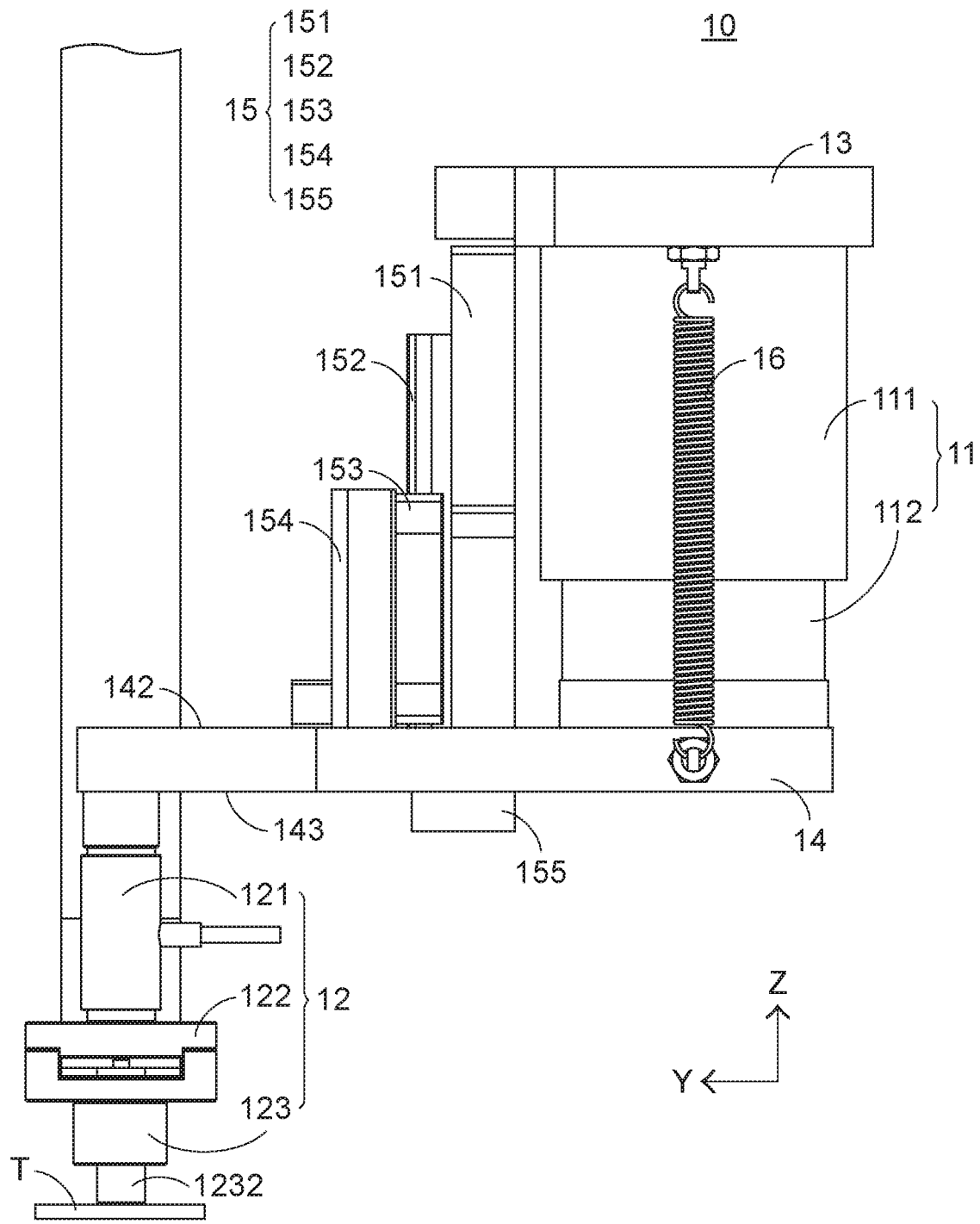

Please refer to FIGS. 1, 2, 3, 4, 5A and 5B. FIG. 1 is a schematic perspective view illustrating a force and vibration measurement device according to an embodiment of the present invention. FIG. 2 is a schematic side view illustrating the force and vibration measurement device shown in FIG. 1. FIG. 3 is a schematic exploded view illustrating the force and vibration measurement device shown in FIG. 1. FIG. 4 is a schematic circuit block diagram of the force and vibration measurement device shown in FIG. 1. FIGS. 5A and 5B schematically illustrate the relationships and the operations of an actuator, a fixing plate, a movable plate, a testing assembly and a guiding mechanism of the force and vibration measurement device shown in FIG. 1.

As shown in FIGS. 1 and 2, the force and vibration measurement device 10 comprises an actuator 11, a fixing plate 13, a movable plate 14, a testing assembly 12 and a guiding mechanism 15.

The actuator 11 is used to drive the testing assembly 12, change the magnitude of the applied force on an under-test object T and change the distance between the testing assembly 12 and the under-test object T. The testing assembly 12 is used to apply the force on the under-test object T. In addition, the testing assembly 12 collects the data about the magnitude of the applied force on the under-test object T, the data about the vibration amount of the under-test object T or the combination data of the applied force and the vibration amount.

The guiding mechanism 15 is used to limit the operating direction of the actuator 11. The fixing plate 13 is used for fixing the actuator 11 and the guiding mechanism 15. The movable plate 14 is connected with the actuator 11 and the testing assembly 12. When the force and vibration measurement device 10 is powered on and operated, the testing assembly 12 is moved back and forth by the actuator 11 through the movable plate 14. Since the operating direction of the actuator 11 is limited by the guiding mechanism 15, the testing assembly 12 is moved in the same direction.

The structure of the movable plate 14 of the force and vibration measurement device 10 will be described in more details as follows.

Please refer to FIG. 1. The movable plate 14 comprises a hollow portion 141, a first surface 142, a second surface 143 and a wire receiving hole 144. The first surface 142 and the second surface 143 are opposed to each other. The hollow portion 141 and the wire receiving hole 144 run through the first surface 142 and the second surface 143 of the movable plate 14.

The structure of the actuator 11 of the force and vibration measurement device 10 will be described in more details as follows.

As shown in FIG. 3, the actuator 11 comprises a fixed part 111 and a movable part 112. The fixed part 111 and the movable part 112 have cylindrical structures in appearance. The movable part 112 is movable relative to the fixed part 111. The fixed part 111 is perpendicularly connected with the fixing plate 13. The movable part 112 is perpendicularly connected with the first surface 142 of the movable plate 14. The fixed part 111 comprises a fixing wall 1111, a fixing post 1112 and an annular groove 1113. The annular groove part 1113 is arranged between the fixing wall 1111 and the fixing post 1112. The movable part 112 comprises a moving wall 1121 and an accommodation space 1122. The accommodation space 1122 is formed in the moving wall 1121. When the movable part 112 is moved linearly relative to the fixed part 111 along the Z-axis direction, the moving wall 1121 is movably inserted in the annular groove part 1113, and the fixing post 1112 is accommodated within the accommodation space 1122. Preferably but not exclusively, the actuator 11 comprises a voice coil motor, a stepper motor, a servo motor or a DC motor.

The structure of the testing assembly 12 of the force and vibration measurement device 10 will be described in more details as follows.

As shown in FIG. 3, the testing assembly 12 comprises a force sensor 121, a vibration sensor 122 and a test probe 123. The test probe 123 is located near the under-test object T. In this embodiment, the vibration sensor 122 is arranged between the force sensor 121 and the test probe 123. It is noted that the positions of the force sensor 121 and the vibration sensor 122 are not restricted. For example, in another embodiment, the positions of the vibration sensor 122 and the force sensor 121 are exchanged.

The force sensor 121 is connected with the second surface 143 of the movable plate 14. The force sensor 121 comprises a sensor body 1211, a wire outlet 1212 and a first transmission wire 1213. The wire outlet 1212 is protruded from an outer surface of the sensor body 1211. The first transmission wire 1213 is protruded from the sensor body 1211 and penetrated through the wire outlet 1212 and the wire receiving hole 144 of the movable plate 14. An example of the force sensor 121 includes but is not limited to a pressure sensor. By the force sensor 121, the data about the pressing force on the under-test object T is collected, and the magnitude of the pressing force is converted into an electronic signal. Then, the electronic signal is outputted.

The vibration sensor 122 comprises a casing 1222 and a sensing element 1222. Preferably but not exclusively, the casing 1222 is made of plastic material. In an embodiment, the casing 1222 comprises an upper cover 12211 and a lower cover 12212. The upper cover 12211 is connected with the sensor body 1211 of the force sensor 121. The lower cover 12212 comprises a first magnetic attraction part 122121. The sensing element 1222 comprises a sensing part 12221 and a second transmission wire 12222. The sensing part 12221 is fixed between the upper cover 12211 and the lower cover 12212. The second transmission wire 12222 is extended from the sensing part 12221 and protruded out of the space between the upper cover 12211 and the lower cover 12212. Preferably but not exclusively, the sensing part 12221 is an acceleration sensor, a gravity sensor or an accelerometer. By the sensing part 12221, the data about the vibration amount of the under-test object T is collected, and the displacement amount corresponding to the vibration amount is converted into an electronic signal. Then, the electronic signal is outputted.

The test probe 123 comprises a probe body 1231 and a detecting part 1232. The probe body 1231 is located near the vibration sensor 122. The probe body 1231 comprises a second magnetic attraction part 12311. The second magnetic attraction part 12311 and the first magnetic attraction part 122121 are magnetically attractable by each other. The detecting part 1232 is connected with the probe body 1231. The probe body 1231 is contacted with the under-test object T to press the under-test object T. Preferably but not exclusively, the test probe 123 is made of copper. Due to the magnetic attraction between the first magnetic attraction part 122121 of the vibration sensor 122 and the second magnetic attraction part 12311 of the test probe 123, the test probe 123 can be fixed on the vibration sensor 122. Consequently, the test probe 123 can be detached quickly and replaced with another test probe according to the practical test requirements. It is noted that the connecting mechanism between the vibration sensor 122 and the test probe 123 is not restricted. For example, in another embodiment, the vibration sensor 122 and the test probe 123 are connected with each other in a screwing manner.

The structure of the guiding mechanism 15 of the force and vibration measurement device 10 will be described in more details as follows.

Please refer to FIG. 3 again. The guiding mechanism 15 is located beside the actuator 11. The guiding mechanism 15 comprises a guiding body 151, a sliding rail 152, a sliding block 153, a fixing block 154 and a stopping block 155. The guiding body 151 has a top surface 1511 and a bottom surface 1512. The top surface 1511 and the bottom surface 1512 are opposed to each other. The top surface 1511 of the guiding body 151 is connected with the fixing plate 13. The bottom surface 1512 of the guiding body 151 is penetrated through the hollow portion 141. The sliding rail 152 is connected with the guiding body 151. The sliding rail 152 comprises two recesses 1521. The two recesses 1521 are concavely formed in the sliding rail 152. The sliding block 153 comprises an edge wall 1531, two lateral walls 1532 and a slide space 1533. The two lateral walls 1532 are perpendicular to the edge wall 1531. The two lateral walls 1532 are located beside the guiding body 151. The slide space 1533 is formed between the guiding body 151, the edge wall 1531 and the two lateral walls 1532. The sliding rail 152 is accommodated within the slide space 1533. Moreover, two protrusion structures 15321 facing the slide space 1533 are respectively protruded from the two lateral walls 1532. In addition, the two protrusion structures 15321 are respectively aligned with the corresponding recesses 1521. The protrusion structures 15321 are respectively slidable along the corresponding recesses 1521. Consequently, it is assured that the movable part 112 is moved linearly relative to the fixed part 111 along the Z-axis direction. The fixing block 154 is connected with the sliding block 153 and the first surface 142 of the movable plate 14. In other words, the sliding block 153, the fixing block 154 and the movable plate 14 are fixed and linked with each other. The stopping block 155 comprises a stopping surface 1551. The stopping surface 1551 is connected with the bottom surface 1512 of the guiding body 151. In an embodiment, at least one of the length, width and area of the stopping surface 1551 is larger than the corresponding one of the length, width and area of the hollow portion 141 of the movable plate 14. Due to the limitation of the stopping block 155, the movable plate 14 will not be detached from the guiding body 151.

Please refer to FIG. 1 again. In an embodiment, the force and vibration measurement device 10 further comprises at least one elastic element 16. The elastic element 16 is connected with the fixing plate 13 and the movable plate 14. Preferably but not exclusively, the elastic element 16 is a tension spring.

Please refer to FIG. 3 again. In an embodiment, the force and vibration measurement device 10 further comprises a wire arranging block 17. The wire arranging block 17 is connected with the fixing block 154 of the guiding mechanism 15. The wire arranging block 17 comprises a wire arranging structure 171. The wire arranging structure 171 is concavely formed in the surface of the wire arranging block 17. The wire arranging structure 171 is in communication with the wire receiving hole 144 of the movable plate 14. The first transmission wire 1213 of the force sensor 121 is accommodated within the wire receiving hole 144. In addition, the first transmission wire 1213 is fixed in the wire arranging structure 171.

The operations of the actuator 11, the fixing plate 13, the movable plate 14, the testing assembly 12 and the guiding mechanism 15 for measuring the under-test object T will be described with reference to FIGS. 5A and 5B.

When the actuator 11 is not electrically conducted, the actuator 11 is disabled. In this situation, there is a gap between the detecting part 1232 of the test probe 123 and the under-test object T. When the actuator 11 is electrically conducted, the movable part 112 is moved relative to the fixed part 111 along the Z-axis direction to drive the movable plate 14. The testing assembly 12 is correspondingly moved with the second surface 143 of the movable plate 14. Consequently, the detecting part 1232 of the test probe 123 is in contact with the under-test object T to apply a force on the under-test object T. In addition, the sliding block 153 and the fixing block 154 are correspondingly moved with the first surface 142 of the movable plate 14. Consequently, the sliding block 153 and the fixing block 154 are slid relative to the sliding rail 152.

Please refer to FIG. 1 and FIG. 4 again. In an embodiment, the force and vibration measurement device 10 is connected with a microcontroller 20 through the first transmission wire 1213 of the force sensor 121 and the second transmission wire 12222 of the vibration sensor 122. The microcontroller 20 is connected with a computing device 30 through a USB port, an asynchronous serial communication interface, an Ethernet or a Bluetooth connector.

In an embodiment, the microcontroller 20 comprises a micro-control unit (not shown). An example of the computing device 30 includes but is not limited to a computer, a mobile phone or a tablet computer. The microcontroller 20 receives an analog signal from the force and vibration measurement device 10 and converts the analog signal into a digital signal. Then, the digital signal is transmitted from the microcontroller 20 to the computing device 30. Generally, the circuitry of the force and vibration measurement device 10 is relatively complicated. Due to the arrangement of the microcontroller 20, the circuitry of the force and vibration measurement device 10 will be simplified and concentrated. Furthermore, a control program 301 is installed in the computing device 30. When the control program 301 is executed, an electrical condition of the force and vibration measurement device 10 is correspondingly controlled. The electrical condition includes one of the voltage, the current and the electronic signal or the combination of the voltage, the current and the electronic signal.

Then, the computing device 30 issues a control signal to the actuator 11 through the microcontroller 20. According to the control signal, the operation of the actuator 11 is correspondingly controlled. Consequently, the test probe 123 is driven to apply a pressing force on the under-test object T. Especially, the magnitude of the pressing force can be adjusted to a required value. The data about the pressing force on the under-test object T is collected by the force sensor 121. The data about the vibration amount of the under-test object T is collected by the vibration sensor 122. Then, the data about the pressing force on the under-test object T and the data about the vibration amount of the under-test object T are transmitted to the computing device 30. After these data of the under-test object T are analyzed and compared with the corresponding data of a reference standard (not shown) by the computing device 30, a test result is obtained.

After the test result is obtained, the user can adjust the electrical condition (e.g., one of the voltage, the current and the electronic signal or the combination of the voltage, the current and the electronic signal) through the execution of the control program 301. Then, the computing device 30 issues the control signal to the actuator 11 through the microcontroller 20. According to the control signal, the operation of the actuator 11 is correspondingly controlled. Consequently, the test probe 123 is driven to apply an adjusted pressing force on the under-test object T. The magnitude of the adjusted pressing force is different from the magnitude of the previous pressing force.

It is noted that numerous modifications and alterations may be made while retaining the teachings of the invention. In another embodiment, if the test result of the under-test object T complies with the corresponding data of the reference standard, the electrical condition (e.g., one of the voltage, the current and the electronic signal or the combination of the voltage, the current and the electronic signal) is kept unchanged through the execution of the control program 301. Then, the computing device 30 issues the control signal to the actuator 11 through the microcontroller 20. According to the control signal, the operation of the actuator 11 is correspondingly controlled. Consequently, the test probe 123 is driven to apply the pressing force on a next under-test object. The magnitude of the pressing force is identical to the magnitude of the previous pressing force.

In an embodiment, the under-test object T is an input device. For example, the under-test object T is a force pad, a touch pad, a keyboard or a mouse. Preferably, the under-test object is a force pad.

From the above descriptions, the present invention provides a force and vibration measurement device with a function of providing an adjustable force. Furthermore, it is not necessary to replace parts of the measurement device when the production line is changed. In other words, the drawbacks of the conventional technologies can be overcome.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A force and vibration measurement device for testing an under-test object, the force and vibration measurement device comprising:
   a testing assembly for applying a force on the under-test object, and collecting a force data of the under-test object, a vibration data or a combination of the force data and the vibration data;
   an actuator comprising a fixed part and a movable part, wherein the movable part is movable relative to the fixed part, and the actuator is configured for driving the testing assembly, changing a magnitude of the applied force on the under-test object, and changing a distance between the testing assembly and the under-test object;
   a fixing plate connected with the fixed part of the actuator;
   a movable plate comprising a first surface, a second surface, and a hollow portion, wherein the first surface and the second surface are opposed to each other, the first surface of the movable plate is connected with the movable part of the actuator, and the second surface of the movable plate is connected with the testing assembly; and
   a guiding mechanism comprising a guiding body with a top surface and a bottom surface, wherein the guiding mechanism is for limiting an operating direction of the actuator, the top surface and the bottom surface are opposed to each other, the top surface is connected with the fixing plate, and the bottom surface is penetrated through the hollow portion.

2. The force and vibration measurement device according to claim 1, wherein the testing assembly comprises a force sensor, a vibration sensor and a test probe, wherein the test probe is located near the under-test object.

3. The force and vibration measurement device according to claim 2, wherein the force sensor comprises a pressure sensor.

4. The force and vibration measurement device according to claim 2, wherein the vibration sensor comprises a gravity sensor or an acceleration sensor.

5. The force and vibration measurement device according to claim 2, wherein the vibration sensor comprises a first magnetic attraction part, and the test probe comprises a second magnetic attraction part, wherein the first magnetic attraction part and the second magnetic attraction part are magnetically attractable by each other.

6. The force and vibration measurement device according to claim 1, wherein the actuator comprises a voice coil motor, a stepper motor, a servo motor or a DC motor.

7. The force and vibration measurement device according to claim 1, wherein the guiding mechanism further comprises a sliding rail, a sliding block, a fixing block and a stopping block, wherein the sliding rail is connected with the guiding body, the sliding block is arranged between the sliding rail and the fixing block, the fixing block is connected with the sliding block, the stopping block comprises a stopping surface, and the stopping surface is connected with a bottom surface of the guiding body, wherein a length of the stopping surface is larger than a length of the hollow portion, a width of the stopping surface is larger than a width of the hollow portion, or an area of the stopping surface is larger than an area of the hollow portion.

8. The force and vibration measurement device according to claim 7, wherein the fixing block is further connected with the movable plate, the movable plate is linked with the fixing block, and the fixing block is linked with the sliding block and slidable relative to the sliding rail, wherein the guiding body is limited by the stopping block, so that the guiding body is not detached from the hollow portion.

9. The force and vibration measurement device according to claim 8, wherein at least one recess is concavely formed in a portion of the sliding rail, at least one protrusion structure is protruded from the sliding block and aligned with the at least one recess, and the at least one protrusion structure is slidable along the at least one recess.

10. The force and vibration measurement device according to claim 1, wherein the force and vibration measurement device is electrically connected with a microcontroller, and the microcontroller is connected with a computing device through a USB port, an asynchronous serial communication interface, an Ethernet or a Bluetooth connector, wherein a control program is installed in the computing device.

11. The force and vibration measurement device according to claim 10, wherein when the control program is executed, the force data and the vibration data from the force and vibration measurement device are received and analyzed, and an electrical condition of the force and vibration measurement device is correspondingly controlled, wherein the electrical condition includes one of a voltage, a current and an electronic signal or a combination of the voltage, the current and the electronic signal.

* * * * *